INVENTOR.
Angelo Vaccaro
BY
Johnson and Kline
ATTORNEYS

INVENTOR.
Angelo Vaccaro
BY

ATTORNEYS

Nov. 17, 1970 A. VACCARO 3,541,508

CHARACTER READING SYSTEM

Filed Sept. 8, 1966 3 Sheets-Sheet 3

INVENTOR.
Angelo Vaccaro
BY
Johnson and Kline
ATTORNEYS 3,541,508

CHARACTER READING SYSTEM

Angelo Vaccaro, Port Washington, N.Y., assignor to Columbia Ribbon and Carbon Manufacturing Co., Inc., Glen Cove, N.Y., a corporation of New York Continuation-in-part of application Ser. No. 496,333, Oct. 15, 1965. This application Sept. 8, 1966, Ser. No. 577,895
Int. Cl. G06k 9/00
U.S. Cl. 340—146.3 5 Claims

ABSTRACT OF THE DISCLOSURE

A character reading system for providing an electrical signal for a character read with the signals being different for each different character but with the same character having the same signal in which the character is caused to produce its representative voltage wave having positive and negative conditions, a bistable means is caused to assume one state with the occurrence of a positive condition and the other state with the occurrence of a negative condition and to maintain its state until a state changing condition occurs and in which the state of the flip-flop is stored at selected intervals during the reading of the character with the stored states providing the electrical signal representative of the character read.

The present application is a continuation-in-part of my copending application Ser. No. 496,333 filed Oct. 15, 1965 (now abandoned).

With the advent of mechanical handling or automation of business documents, such as checks, it became essential that the document have information thereon which could be mechanically sensed. The manner in which the information is contained has been essentially standardized by various associations into a few machine language codes. One code approved by the American Bankers Association for use on checks consists of specifications denoting areas of each check on which specific information is to be located. The information is printed on a document with magnetic ink in common machine language of specially configurated characters that is known as type E–13B and with the characters also being so configurated as to be capable of being visually read. Each character has been set forth as having a definite dimensional standard configuration together with tolerances within which a character's dimensions may deviate and still remain acceptable. The printing ink includes not only visually perceivable material but also magnetizable material with limitations placed on the quantity of magnetizable material that is required to be present.

While there are presently many systems that are capable of mechanically reading such characters and producing a known electrical signal indicative of each of the characters, these systems have not been found completely satisfactory. Most systems have generally required that each character not only have a configuration within the dimensional specifications including tolerances but in order that errors in reading will not positively occur, be even dimensionally closer to the standard configuration than the tolerances allow. Additionally, some have employed relatively complicated circuitry including delay lines for measuring wave shapes generated by the characters as they are read while others require not only the standard characters but additional magnetic markings in order to be able to read the characters.

It is accordingly an object of the present invention to provide a reading system for ink characters which is extremely simple in construction but yet provides a different electrical signal for each different character.

Another object of the present invention is to provide a reading system which is capable of reading characters that are even substantially distorted from heretofore acceptable configurations.

A further object of the present invention is to provide a reading system that is capable of reading without error magnetic characters which have been printed with ink having a wide range of content of magnetic material.

Still another object of the present invention is to provide a reading system that achieves the above objects and is relatively rapid in reading characters, extremely economical in construction and durable in use.

The reading systems to which the present invention relates are capable of mechanically reading the standardized font of ten numerals (0–9), and four symbols (transit number, amount, on US and dash) of the common language E–13B of the A.B.A. and producing a different electrical signal for each of the different characters. Each of the thirteen characters has a different configuration in order to be visually perceptible and is printed with ink having magnetizable characteristics. In automatic reading with a tape head, each character is initially magnetized and then passed under the reading tape head to produce a voltage wave that has positive and negative spikes or conditions. The reading head senses only a small vertical linear length at a time and produces a positive condition when the sensed length has greater magnetization than the preceding sensed length and a negative condition when the sensed length has less magnetization than the preceding sensed length. If there is no change between the sensed length and the preceding length, then neither condition is produced. As each character has a different configuration, it will accordingly produce a voltage signal that has a different combination of positive and negative condition separated by no change conditions.

In carrying out the present invention, a voltage wave is produced for each character as in heretofore known systems by the use of a reading head with the wave being essentially the same whether the reading head reads the character magnetically or optically. However, a feature of the present invention resides in using certain spikes and their time relationship to provide an electrical signal indicative of the character read. Initially, every pulse, both negative and positive, and irrespective of their amplitude, is electrically altered to substantially the same amplitude while retaining their relative time relationship and preferably is made into substantially square wave spikes. The positive and negative square wave spikes are then separated into different channels and introduced into the operating points of a two state means, such as a flip-flop. The appearance of a square wave spike which is derived from a positive voltage wave spike at one operating point produces one state (off) of the flip-flop while the appearance of a square wave spike derived from a negative voltage wave spike at the other operating point of the flip-flop produces the other state (on) of the flip-flop. It will thus be understood that in the specific embodiment shown, if the flip-flop is in its off state it will maintain this state even with subsequent positive voltage wave spikes and will only change its state when a negative voltage wave spike appears and will thus remain until a positive spike appears.

The configuration of the characters of the ABA language are divided into seven vertical areas and in accordance with the present invention the state of the two state means is sensed for each of these seven areas and at least the state for six areas is sequentially stored in storage means, such as a shift register. After the seven states have been sensed and at least six stored, the shift register has a specific binary representation indicative of the character read with each character of the code having a different representation in the shift register. The condition of the shift register may then be decoded into decimal signals, i.e. produce a change in any one of thirteen leads or shifted into the common 8421 binary code. It will be understood that the information in the storage means though in binary form, is of a code different than the common binary representative of the numbers and characters and thus while it may be used directly, it is also capable of being converted into any standard binary or decimal code for use with other automated devices which will only accept standard codes.

Though a unique binary representation for each character in the ABA code may be achieved with the storage of six states of the two state means, other codes may require more or less states of the two state means to be stored.

Other features and advantages will hereinafter appear.

Figure 1:
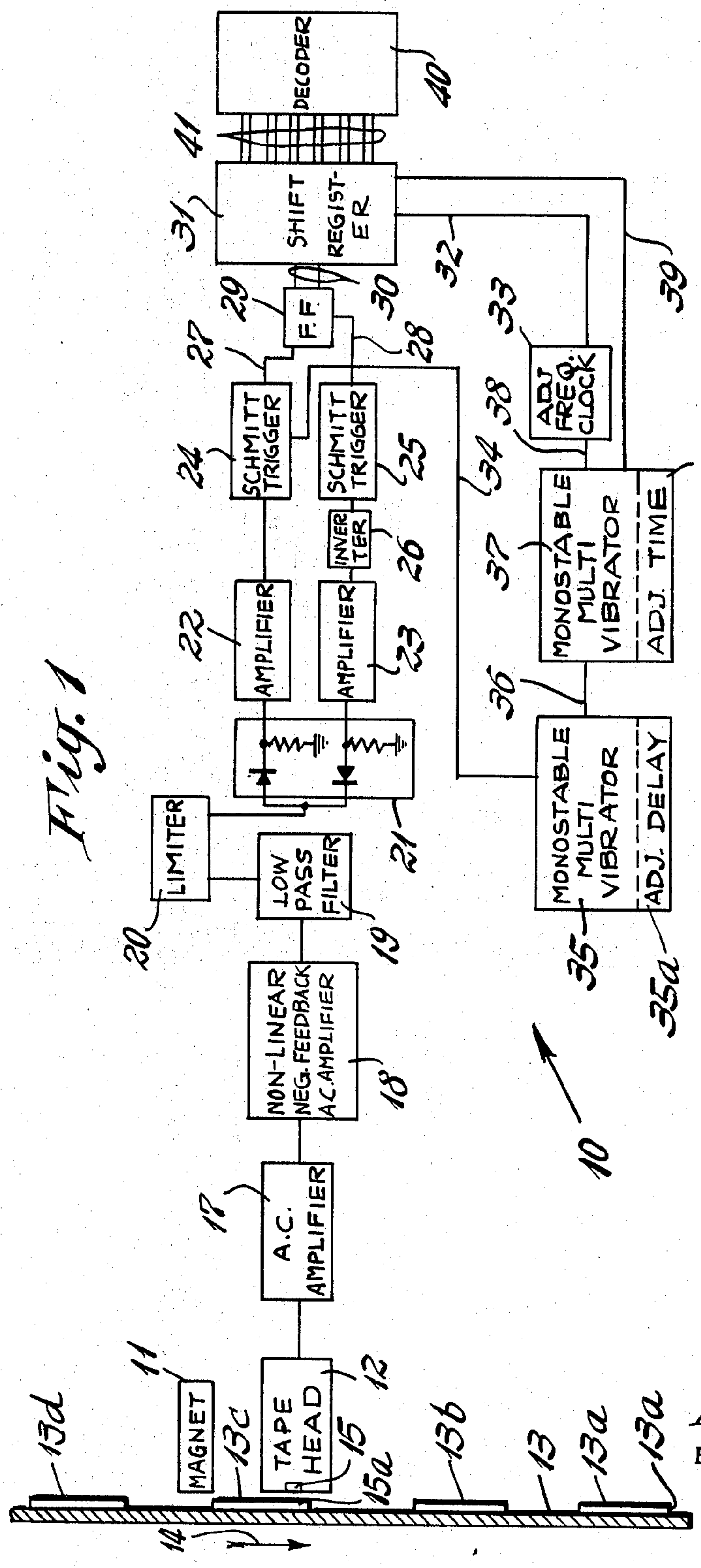
FIG. 1 is a block diagram of the various components in the character reading system of the present invention with the characters being formed with magnetic particles and the specific system having a tape head.

Referring to the drawing, the system for automatically reading machine language ABA characters is generally indicated by the reference numeral 10 and includes a magnet 11 together with a tape or reading head 12. The magnet and tape head are stationary and a document 13 having characters 13*a*, 13*b*, 13*c* and 13*d* is moved relatively thereto in the direction indicated by the arrow 14 by any conventional means such as a friction wheel. Thus the character 13*a* is read before the character 13*b* etc. by the magnet 11 magnetizing each of the characters and the tape head 12 sensing a thin vertical length 15*a* of each character opposite the portion 15 of the tape head as the document is moved therepast. While the characters are visually read from left to right, each, in the instant system as in other systems, is machine read from right to left and thus the edge 13*a'*, the right-hand vertical edge of the character when it is in its normal visually perceptible position, is machine read first.

The tape head 12 senses in the length 15*a* any change in the amount of magnetizable material thereat from a previous vertical length and if the amount increases, it produces a positive voltage spike or condition while if an amount decreases it produces a negative voltage spike or condition. When there is an absence of magnetizable material or no change in the amount of magnetizable material, neither condition occurs and thus there is no change condition.

Each of the characters is printed with ink having magnetizable material to have a shape corresponding to the American Bankers Association common language code E–13B. The configurations of each character are such that when passed under the tape head 12 they produce a voltage wave with each character having its own distinct voltage wave that is different from any other character. The voltage wave is actually the voltage produced by the tape head correlated with time as the character moves over the tape head and thus while ideally the same character will always produce an identical voltage wave, deviations from the standard dimensions will produce altered voltage waves as will extraneous factors, such as spurious voltages called "noise."

Figures 2, 3, 4:
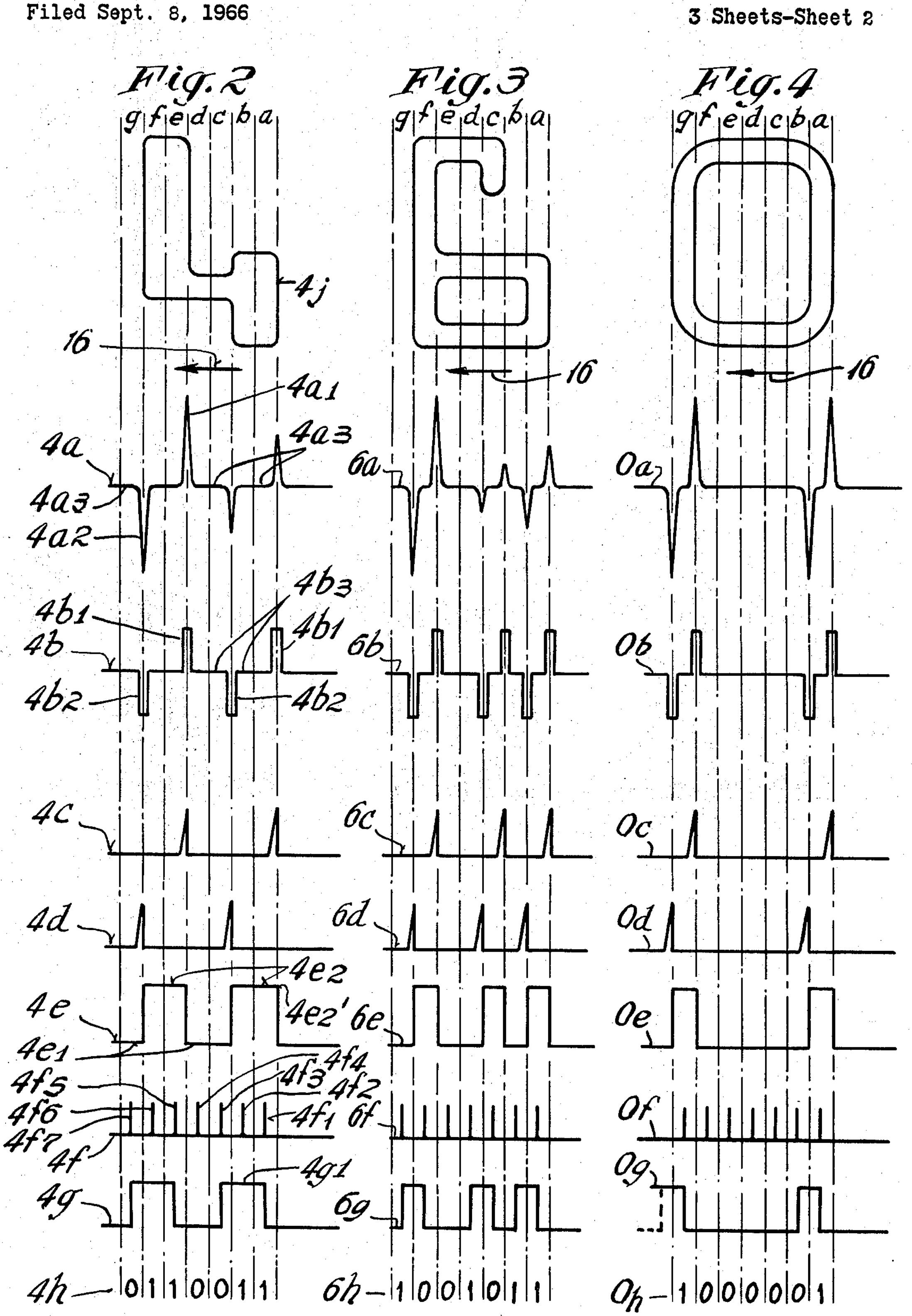
FIG. 2 illustrates the common language numeral 4 and voltage waves and conditions that occur in different parts of the system when this numeral is read.
FIG. 3 is similar to FIG. 2 only for the common language numeral 6.
FIG. 4 is similar to FIGS. 2 and 3 only for the common language character zero.

Referring to FIG. 2, there is shown for the common language character numeral 4, a voltage wave 4*a* that is produced when read by the reading head 12. It includes positive voltage wave spikes 4*a*1 and negative voltage wave spokes 4*a*2 together with zero or no change voltage portions 4*a*3. The voltage spokes and length of the no change conditions are horizontally located on the voltage wave in accordance to where a change or no change in the amount of magnetizable material appears on the character as it is passed under the reading head.

Assuming that the character 13*c* being read in FIG. 1 is the common language numeral 4, the voltage wave 4*a* is introduced as produced by the reading head to an amplifier 17 by which the spikes are amplified and which in turn are introduced into a nonlinear negative feedback A.C. amplifier 18. The A.C. amplifier 17 merely amplifies the voltage produced by the tape head while the negative feedback amplifier 18 amplifies unequally all spikes so that its output has spikes of substantially similar amplitude. Each amplitude altered spike is then passed through a low pass filter 19 and a limiter 20. The low pass filter 19 filters unwanted voltages, such as noise, that may be present while the limiter 20 decreases or chops each spike to a relatively small, constant amplitude. The output of the limiter is shown in FIG. 2 as a voltage wave 4*b* that has amplitude altered positive spikes 4*b*1 for the positive spikes 4*a*1 of the voltage wave 4*a* and amplitude altered negative spikes 4*b*2 for the negative spikes 4*a*2. In addition, the voltage wave 4*b* includes no change conditions 4*b*3 between the spikes with the time length of the conditions being substantially unchanged.

Connected to receive the output from the limiter 20 is a polarity separator 21 which separates the positive and negative spikes and directs the positive spikes into an amplifier 22 and directs the negative spikes into an amplifier 23 with each amplifier being designed to amplify the polarity of the input spike introduced thereto. The output of amplifier 22 is connected to the input of a Schmitt trigger 24 and the output of amplifier 23 is also connected to a Schmitt trigger 25. However, as the output of the amplifier 23 amplifies only negative spikes, and the trigger 25 is similar to the trigger 24 and requires a positive signal, an inverter 26 is interposed to invert the polarity of the negative spikes. The triggers 24 and 25 are regenerative bistable circuits whose state depends on the amplitude of the input voltage and thus the output of the triggers is essentially a voltage spike of constant amplitude for each input pulse of a known magnitude received thereby.

As shown in FIG. 2, the voltage wave of the output of the amplifier 22 which includes just the positive spikes of the voltage wave 4*a* is indicated by the reference character 4*c* while the voltage wave of the output from the inverter 26 constituting positive spikes of the negative spikes 4*a*2 of the wave 4*a* is indicated by the reference character 4*d*. It will be appreciated that the relative time position of the spikes has been maintained.

A lead 27 and a lead 28 from the output of the Schmitt triggers 24 and 25 respectively are connected to a two state means 29, specifically a bistable flip-flop having two separate trigger points with one lead being connected to one trigger point and the other lead to the other trigger point. The lead 27 is connected to the trigger point which changes the state of the flip-flop 29 to an "on" state and even though the voltage on the lead 27 decreases, ceases or repeats, the flip-flop will maintain its on condition. When a spike appears on the lead 28, connected to the off state trigger point, the flip-flop 29 will change its state to an "off" state. Thus even though the flip-flop 29 receives a plurality of spikes on the lead 27, as would happen when a plurality of successive positive voltage wave spikes occurred, it will maintain its on state until it receives a spike on the lead 28. Similarly for a series of successive negative voltage wave spikes, the off state will be maintained until a spike appears on the lead 27.

The state of the flip-flop 29 is indicated by the wave *4e* with horizontal lines *4e*1 representing the off state and horizontal lines *4e*2 representing the on state.

The output points of the flip-flop 29 are connected by leads 30 to a shift register 31 which includes a plurality of interconnected stages or flip-flops which, as will be hereinafter understood, may be either 6 or 7 in number. The shift register has a lead 32 connected to its trigger point. Upon receipt of a clock pulse thereon, the first stage of the shift register transfers its state to the second stage and then changes its state to assume the same state of the flip-flop 29. The clock pulses on the lead 32 are obtained from a clock 33 which is an adjustable oscillator circuit with the pulses being substantially instantaneous but of sufficient amplitude. The duration between pulses is related to the speed at which the characters are passed beneath the tape head and the number of times it is desired to sense and store the condition of the flip-flop 29. For reasons which will be hereafter apparent the duration is determined by dividing the time the character could be under the tape head 12 by the number 7.

For initiating operation of the clock 33 to provide a train of seven pulses in the lead 32, a lead 34 is connected between a monostable multi-vibrator 35 and the trigger 24, with the former including an adjustable delay 35*a*. When a spike appears on the lead 34, the multi-vibrator 35 changes from an "off" to an "on" condition. However, the change in condition will not occur until a determined period of time as set by the adjustable delay 35*a*, has elapsed. After the elapsed time, the change occurs and a signal appears on a lead 36 connected to a second monostable multi-vibrator 37 which shifts it to its on condition to produce a voltage level signal on a lead 38 to the clock 33. The monostable vibrator 37 is also adjustable by adjustable means 37*a* to set the time that it remains in its on condition after receipt of a signal on the lead 36. The on time is a period which enables the clock 33 to provide the train of seven pulses on the lead 32 and then when the vibrator 37 returns to its off condition, the change in the voltage level on the lead 38 prevents further operation of the clock 33. Thus, irrespective of whether or not the multi-vibrator 35 shifts between its on and its off condition after changing the condition of the vibrator 37 to its on condition, the vibrator 37 will maintain its on condition for its set duration. The duration is made sufficient for the tape head to read the widest character by adjustment of the means 37*a*.

The vibrator 37 has another lead 39 that is connected to the shift register 31 and is employed when the voltage level of the vibrator indicates its off condition, to supply a voltage to the shift register to enable it to transfer its condition to a decoder 40.

The clock pulses in the lead 32 are depicted in FIG. 2 in the wave form *4f* and at the time of each pulse on the lead 32, the shift register advances its information to a subsequent stage and the entrance stage of the shift register 31 will be caused to assume the state that the flip-flop 29 has at the instant of the clock pulse.

In the operation of the system to read the language numeral 4 when the initial edge *4j* (FIG. 2) of the numeral is read by the tape head, it produces the positive voltage wave spikes shown in wave forms *4a*, *4b* and *4c* that are substantially vertically aligned with the edge *4j*. The spike then appears on the lead 27 and as the flip-flop 29 is in the off state, it is changed to its on state as shown in the wave *4e* at the point *4e*2'. Additionally as the spike *4a*1 is positive it changes the condition of the Schmitt trigger 24, transmitting a signal on the lead 34 to the vibrator 35. The adjustable delay 35*a* of the vibrator 35 prevents initial changing of the vibrator 35 and after the delay has elapsed, the vibrator 35 changes, changing the condition of the vibrator 37 with the latter initiating operation of the clock 33 to supply a train of seven pulses to the shift register 31.

The clock pulses are shown in the wave form *4f* and the initial pulse *4f*1 is somewhat leftward of being vertically aligned with the edge *4j* indicating that there has been a relative time shift. When the first clock pulse *4f*1 is introduced to the shift register 31 it causes the first state thereof to assume the same state of the flip-flop 29 at the time that the pulse *4f*1 appears. This is shown in wave form *4g* which is representative of the state of the first stage of the shift register at the horizontal line *4g*1 that indicates that the initial stage has assumed an on condition.

As the character continues moving in a direction of the arrow 16, the next clock pulse *4f*2 occurs and effects shifting of the information in the shift register from the first stage to the second stage and the first stage at this instant assumes the on state of the flip-flop 29.

The next clock pulse *4f*3 appears, shifts the information in the shift register and the initial stage of the shift register assumes the off state of the flip-flop 29. The change of state of flip-flop 29 occurred with the appearance of the first negative spike *4a*2 which subsequently produced a trigger signal in the lead 28. The fourth clock pulse *4f*4 again shifts the shift register and the first stage assumes the off state of the flip-flop 29. The clock pulse *4f*5 shifts the shift register and the first stage of the shift register will change to an on state which is the condition of the flip-flop 29 and which occurred with the appearance of the second positive spike of the voltage wave *4a*. For clock pulse *4f*6, the flip-flop 29 is in the on state and the first stage of the shift register assumes this state. For the pulse *4f*7, the flip-flop 29 is in the off state and the first stage will thus assume the off state. The time of the on condition of the vibrator 37 elapses after the seventh clock pulse thereby preventing further clock pulses.

The condition of each of the seven stages of the shift register is indicated at the form *4h* in binary representation with the binary digit 0 representing off and binary digit 1 representing on and with the condition of the first stage of the shift register being leftmost and the condition of subsequent stages extending rightwardly therefrom. Accordingly, the seven stage shift register will have a binary condition of 0110011 with the first 0 representing the first stage of the flip-flop, the next two 1's the second and third stages, the next two 0's the fourth and fifth stages and the next two 1's the sixth and seventh stages.

Each of the characters in the ABA common language has specifications of the height and width dimensions of its configuration. In accordance with the present invention wherein the system is specifically disclosed for reading ABA characters, the width dimensions are subdivided into seven width areas that are approximately equal with the printing width of the widest character extending slightly more than seven width areas while less wider characters extend lesser width areas. The printed width of character 4 for example only extends six width areas. Most changes in the vertical edges of each character are dimensioned to occur on the boundaries of each area (except for small radii) and the width of each vertical segment of a character is substantially a multiple of a vertical width area.

Referring to FIG. 2, the width areas for the language numeral 4 are indicated by reference characters *a* through *g* and delineated by vertical lines. As a character is passed under the tape head, a definite time is required to have the tape head read the width of one area and thus the spacing of the vertical lines is also indicative of a time relationship. The eight vertical lines delineating the width areas are continued through the forms *4a*–*4h* to provide time relationship between the various depictions, it being understood that vertically aligned portions of each of the forms occur substantially simultaneously.

The edge *4j* is the beginning of the width *a* that starts at the vertical boundary line *a*1 and is vertically aligned with the edge *4j* of the numeral 4. The positive and negative pulses in the wave form *4a* thus occur substantially at the boundary lines between the width areas *a* through *g* and as the wave shapes 4*b* through 4*e* constitute merely changes in configuration or condition of the spikes shown in form 4*a*, these changes also occur substantially along the boundary of the areas and hence simultaneously, there being basically no delay in the translation between a spike and the change in the state of the flip-flop 29. However, the clock pulses shown in form 4*f* occur approximately at the middle of each width area and thus the change in the shift register will occur substantially at the middle of each of the width areas of each character.

The time lag between the change in state of the flip-flop 29 and the appearance of the pulse 4*f*1 is adjusted by the delay 35*a* and may be other than in the middle of a width area if desired. The duration between pulses is adjusted by the clock 33 to be equal to the time required for one width area to pass under the tape head while the delay 37*a* is set for slightly more than seven times the duration between pulses.

Shown in FIG. 3 is the common language numeral 6 with wave forms and other information indicated by reference characters 6*a*–6*h* relating thereto being vertically aligned therewith. Each form in this figure is horizontally aligned with a wave form in FIG. 2, is indicated by having the same alphabetical letter in its reference character and occurs in the system for the numeral 6 as it would when the numeral 4 is read. Also, the seven width areas *a* through *g* are shown between vertical lines. When the numeral 6 is read, the voltage wave form 6*a* will be produced with three positive spikes and three negative and will cause the binary condition depicted in form 6*h* in the shift register to be present, namely the first, third, fourth and sixth stages being off and the second, fifth and seventh stages being on.

The ABA common language character zero is shown in FIG. 4, along with forms 0*a* through 0*h* that correspond to the same condition of the system as do the forms in FIGS. 2 and 3 horizontally aligned therewith. The character zero has two positive voltage spikes and two negative voltage spikes and a shift register condition of all stages being off except stages 1 and 7 which are on developing in the shift register 31 the code 1000001.

For each of the thirteen characters of the common language code the shift register assumes a binary condition of its seven stages as follows:

| Character: | Stage 1 | 2 | 3 | 4 | 5 | 6 | 7 |
|---|---|---|---|---|---|---|---|
| 1 | 0 | 0 | 0 | 0 | 1 | 1 | 1 |
| 2 | 0 | 0 | 0 | 1 | 0 | 0 | 1 |
| 3 | 0 | 0 | 0 | 0 | 0 | 1 | 1 |
| 4 | 0 | 1 | 1 | 0 | 0 | 1 | 1 |
| 5 | 0 | 0 | 1 | 0 | 0 | 0 | 1 |
| 6 | 0 | 1 | 0 | 0 | 1 | 0 | 1 |
| 7 | 0 | 0 | 1 | 0 | 1 | 0 | 1 |
| 8 | 0 | 1 | 0 | 0 | 0 | 1 | 1 |
| 9 | 0 | 1 | 0 | 0 | 0 | 0 | 1 |
| 0 | 1 | 0 | 0 | 0 | 0 | 0 | 1 |
| Transit No. | 1 | 1 | 0 | 0 | 1 | 1 | 1 |
| Amount symbol | 1 | 1 | 0 | 1 | 0 | 1 | 1 |
| On US symbol | 1 | 0 | 1 | 0 | 1 | 1 | 1 |
| Dash symbol | 1 | 1 | 0 | 1 | 1 | 0 | 1 |

Figure 5:
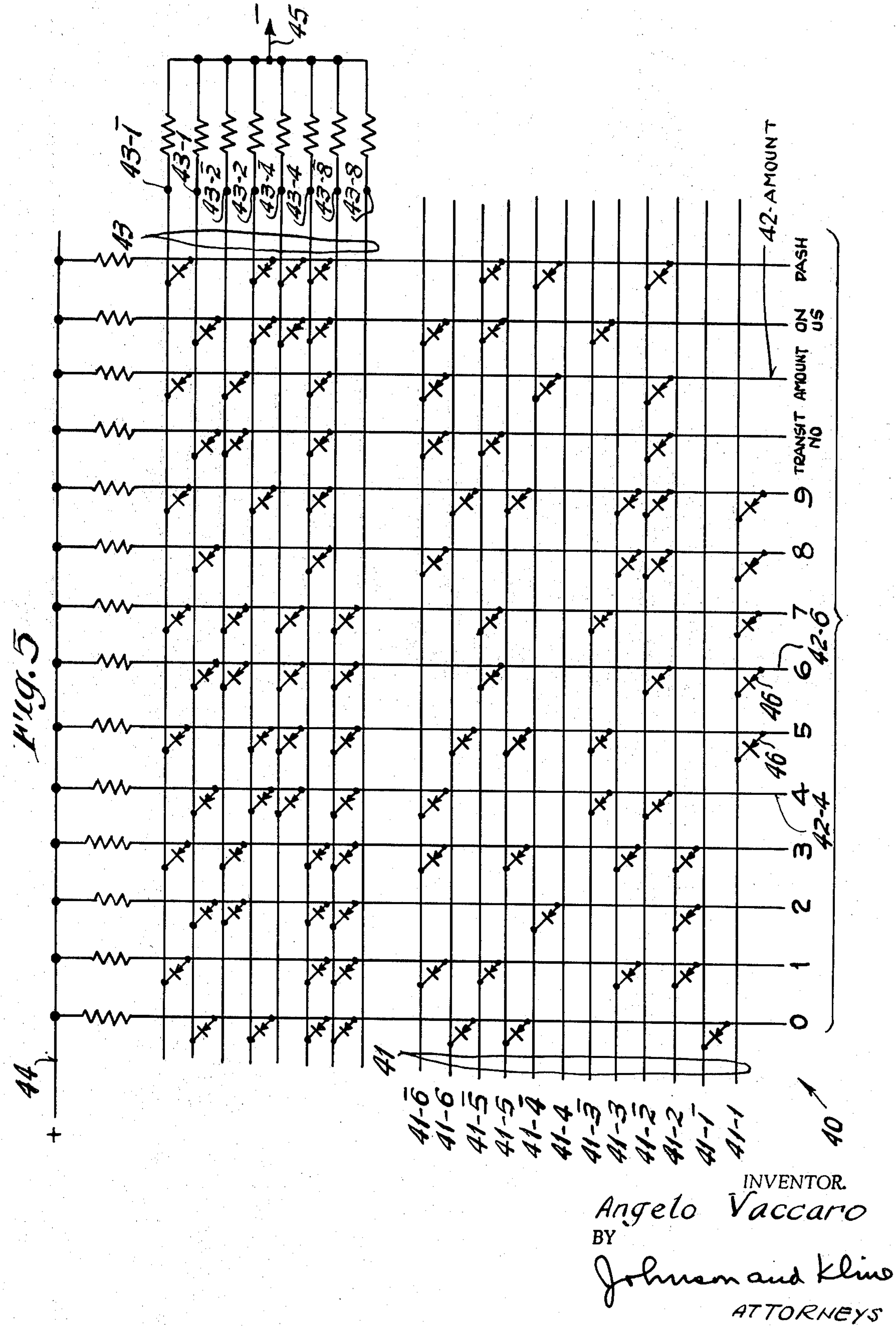
FIG. 5 is a diagrammatic illustration of a decoder that may be used with the system of the present invention to provide character identification in standard decimal and binary code.

The above-noted code may be utilized directly to control or provide information to other equipment such as a sorting machine. For equipment that is capable of intelligently accepting only code that is in standard or binary form, the present unique code may be easily decoded into such standard codes. Thus referring to FIG. 5 the decoder 40 has a plurality of inputs 41 which are connected to the stages 1 through 6 of the shift register 31. Each of the stages has a pair of outputs, for example, the stage 1 has outputs 41–$\bar{1}$ and 41–1; stage 2, 41–$\bar{2}$ and 41–2; stage 3, 41–$\bar{3}$ and 41–3; etc. connected to be the input to the decoder. The seventh stage is always positive and is not presently utilized in the specific embodiment of the decoder herein shown. It may, however, if a 7 stage decoder is employed be utilized to provide the trigger signal to the decoder instead of the lead 39 and to perform other functions indicating that seven pulses have occurred.

The decoder has a plurality of individual output leads, collectively indicated by the reference number 42, and with a change of condition on a different lead occurring for each of the different characters. In addition to the decimal code appearing in the leads 42 for each character, there is another output from the decoder on leads generally indicated by the reference character 43, which provides an indication of the character read in 8421 binary code on the leads 43–$\bar{1}$ and 43–1, 43–$\bar{2}$ and 43–2, 43–$\bar{4}$ and 43–4, 43–$\bar{8}$ and 43–8. For each character read there is accordingly made available for subsequent use an electrical indication of the read character in (a) the unique code of the shift register (b) a standard decimal code and (c) an 8421 standard binary code.

The decoder has a positive input 44 and a negative input 45 for providing the power to the various interconnections. A plurality of diodes, generally indicated by the reference character 46, are interconnected between the different horizontal and vertical leads constituting the connections between said leads.

In the operation of the decoder, each stage of the shift register if it is in the 0 or off condition produces a negative potential on its lead having the overhead dash and a ground or relatively positive potential on its lead without the dash. Each indication on the leads 42 of the character read effects a change in the lead corresponding to the character read from a negative potential to a ground or positive potential and thus under normal conditions all leads 42 are negative except for the one corresponding to the character read. In 8421 binary code, an indication of the same character appears with the leads 43 having the overhead dash for a 0 binary condition and being negative while the lead number without the dash is positive for a 1 condition.

A change is made in either one or the other or both of the leads by the overhead dash lead going positive or the other non-dash lead going negative.

With the above understood, when the character 4 is read the input leads 41 will be coded 011001 which causes input leads 41–$\bar{2}$, 41–$\bar{3}$ and 41–$\bar{6}$ to be not negative. The only connections through diodes to the character 4 lead 42–4 are these three leads and thus the lead 42–4 will become not negative or positive as all connections thereto are not negative. All the other 42 leads will be negative and thus a signal will be produced in decimal code by the lead 42–4 having a lesser negative potential than all the other leads.

The change in potential of the lead 42–4 changes the potential in the lead 43–$\bar{4}$ of the leads 43 to not negative and thus there is read out in 8421 binary code, the condition 0100 representing the decimal number 4.

For the character 6 the code of the instant system is 010010 and the leads 41–$\bar{2}$ and 41–$\bar{5}$ will be at ground potential as will the lead 41–1 and hence all connections to the lead 42–6 will be at ground potential changing the potential in this lead to a ground potential. In the leads 43, specific leads 43–$\bar{2}$ and 43–$\bar{4}$ will change to ground potential giving the condition 0110 in 8421 binary code.

Other characters in the common machine language may also be indicated in three different codes. Considering the amount symbol for example, the code on the input leads 41 will be 110101 which changes leads 41–2, 41–$\bar{4}$ and 41–$\bar{6}$ to ground potential that causes the lead 42-amount to become positive, changing the condition of leads 43–$\bar{1}$, 43–$\bar{2}$ and 43–$\bar{8}$ to produce in 8421 binary code the condition 1011. The transit number produces in the leads 43, a binary condition of 1010; the on US symbol 1100; and the dash 1101 with each symbol also having its lead 42 changed to a relatively positive condition when the condition of the shift register indicates that such characters have been read.

It will be appreciated from the above that the character recognition system of the present invention will recognize errorlessly a character which departs substantially from its set physical standards. Variations in a character or between characters may occur in many places including (a) vertical dimensions (b) horizontal dimensions (c) skew or angled with respect to the line of type (d) amount of magnetic material in the printed character and its characteristics (e) uneven or ragged edges (f) voids of magnetic material in the printed character (g) spacing between letters etc.

By not utilizing the exact amplitude of each spike but only that fact that a spike occurs, all variations except *g* may vary substantially from the standard without introducing error. By the present system of storing information when reading in the middle of a width area, items *a*, *b*, *c*, *e* and *f* may vary substantially and still be read errorlessly. As the system only begins reading a character and storing the information after the leading edge of the character is under the tape head, item *g* may substantially vary. Additionally spurious voltages or noise which may be present in the voltage wave may be easily eliminated and prevented from providing a false signal. The speed of the characters past the reading head may be adjusted and the present system easily accommodates a change in the speed in which a character is read by adjustment of the members 33, 35*a* and 37*a*.

From the foregoing it will be understood that there has been disclosed a magnetic ink character recognition system which is capable of reading and providing a different electrical signal for each of the characters of the common language code. The system is capable of errorless recognition even with substantial variations of the characters from the standards. This is achieved by utilizing a two state means which is caused to assume one state for a positive spike and the other state for a negative spike irrespective of the amplitude of the spikes and to retain its attained state until changed to its other state. The condition of the bistable means is sensed at spaced intervals during the reading of the number and each state sensed is stored in the storage means in the order sensed. After completion of the reading, the storage means thus has a plurality of states and the combined states are such as to provide a different condition of the storage means for each different character. The condition of the storage means which is an electrical representation of the character read may be employed directly to provide such information to other equipment or if desired is decoded into both standard decimal and binary code.

Figure 6:
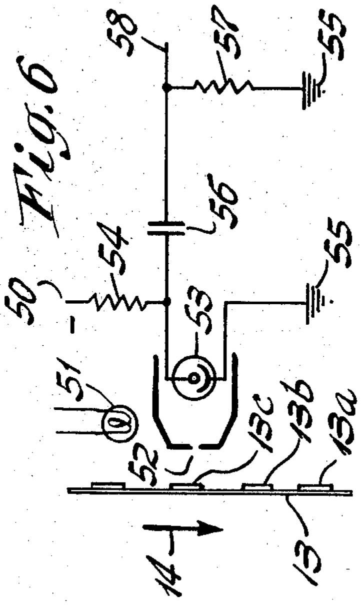
FIG. 6 is a pictorial and electrical schematic diagram of an optical reading means which may be used to read nonmagnetic ink characters or if desired used to read magnetic characters optically.

Shown in FIG. 6 is a pictorial and electrical schematic diagram of an optical reading circuit which may be employed in place of the tape head 12 and magnet 11. The circuit is generally indicated by the reference numeral 50 and is shown positioned to have a card 13 bearing dark colored ink characters 13*a* move therepast in the direction of the arrow 14. An electric bulb 51 directs light onto the card and light is reflected off the cards and characters through a small slit 52 onto a photocell 53. The slit has a small width, for example on the order of .003 inch, and extends for at least the length of the vertical segment of the character to be read. In the embodiment for reading ABA code characters the slit extends for at least the height of the characters. One end of the photocell is connected through a resistor 54 to a source of negative potential while its other end is connected to ground 55. A condenser 56 has one side connected to the one end of the photocell and its other side is connected through a resistor 57 to ground 55. A lead 58 is connected to the other side and constitutes the output lead of the circuit on which the voltage wave will appear and is thus connectible to the input of the A.C. amplifier 17.

As the photocell increases its resistance when it senses a decrease in the quantity of light the appearance of a vertical segment of the character is sensed through the slit by the photocell increasing its resistance. The voltage value on the one side of the condenser will then increase negatively and a corresponding positive voltage increase will appear on its other side. Thus a positive voltage spike will occur on the lead 58. When the photocell senses a change to more light caused by a decrease in the quantity of ink in the portion of the character opposite the slit, the voltage on the one side decreases causing a negative spike to occur on the lead 58. The system will utilize the voltage wave from the circuit 50 in the same manner that it utilizes the wave from the tape head to provide the electrical representation of the character read.

While the ABA code requires the use of magnetic ink in forming the characters, other codes may not require magnetic particles in the ink. By using magnetic ink, a reading system has the choice of "reading" the character by either a tape head or an optical reading head. Without the magnetic particles there is no choice and hence an optical sensing head must be used. The system of the present invention, as appreciated from the heretofore description of both a tape head and an optical scanner circuit, may thus use either as a reading head to provide an essentially similar voltage wave.

It will be understood from the foregoing that there has been disclosed a system for automatically reading characters to provide an electrical representation of the character read. The system has a two state means which is generally made to reffect the physical changes in the portion of the character that is being scanned. The state of the two state means is sensed when selected portions of the character are being read and the sensed state is caused to be sequentially stored. The stored states constitute a binary representation of the character in unconventional or unique code with each character a representation special to it. The unique code may be used directly in subsequent information processing equipment or translated into well-known codes prior to being used.

Variations and modifications may be made within the scope of the claims and portions of the improvements may be used without others.

I claim:

1. A character reading system for reading any one of a plurality of different characters and providing a stored representation of the character read comprising reading means for providing a voltage wave having a shape representative of the character with positive and negative voltage conditions, two state means, means interconnecting the two state means to the reading means to cause the two state means to assume one state for a positive condition and another state for a negative condition and to retain the same state until changed to its other state, storage means connected to the two state means for storing the instantaneous state of the two state means with the receipt of a pulse and means for providing a train of pulses to the storage means with each pulse ocurring substantially when a selected portion of the character is being read whereby the storage means stores the instantaneous states of the two state means to form a binary representation in unique code of the character read.

2. The invention as defined in claim 1 in which each each character is stylized to be visually perceptible by having vertical ink segments of substantially constant width and varying height and the means for providing the pulses includes means for causing each pulse to occur when substantially the midpoint of its segment is beneath the reading means.

3. A character reading system for reading any one of a plurality of different characters and providing a stored electrical representation of the character read with the character read having a plurality of substantially equal width vertical areas comprising reading means for providing a voltage wave having a shape representative of the character with positive and negative spikes and zero change conditions, said spikes appearing substantially at the first read boundary of each area, two state means, means interconnecting the two state means to the reading means to cause the two state means to assume one state for a positive spike and another state for a negative spike and to retain the same state until changed to its other state and thus be unresponsive to a zero change condition, storage means connected to the two state means for sequentially storing the instantaneous state of the two state means with the receipt of a pulse and means for providing a train of pulses to the storage means with one pulse occurring during the reading of an area of the character and with the number of pulses being at least equal to the number of states desired to be stored.

4. The invention as defined to claim 3 in which the said spikes appear substantially when the initial edge of an area is beneath the reading means and all changes in state of the two state means occurs substantially instantaneously after the appearance of a state changing spike, the means providing the pulses causes the pulses to have a substantially constant time interval therebetween and pulse actuating means for initiating the train of pulses a determined time after the appearance of the first spike, and in which the reading means reads each area in a predetermined time, the interval between pulses is substantially equal to the predetermined time to read an area and the determined time of the pulse actuating means is about one-half of the predetermined time.

5. The invention as defined in claim 4 in which the pulse providing means includes means for adjusting the interval between pulses and the pulse actuating means includes means for adjusting the determined time.

References Cited

UNITED STATES PATENTS

| | | | |
|---|---|---|---|
| 2,846,671 | 8/1958 | Yetter | 340—174 |
| 2,992,408 | 7/1961 | Eldredge et al. | 340—146.3 |
| 3,114,131 | 12/1963 | Furr et al. | 340—146.3 |
| 3,290,651 | 12/1966 | Paufue et al. | 340—146.3 |
| 3,391,387 | 7/1968 | Flores | 340—146.3 |
| 3,113,298 | 12/1963 | Poland et al. | 340—146.3 |
| 3,089,122 | 5/1963 | Seehof et al. | 340—146.3 |
| 3,461,427 | 8/1969 | Parker | 340—146.3 |

THOMAS A. ROBINSON, Primary Examiner